United States Patent
Friestedt (10) Patent No.: US 11,371,606 B2
(45) Date of Patent: Jun. 28, 2022

(54) ARRANGEMENT FOR READING OFF PREDETERMINED POSITIONS OF A GEAR LEVER IN A GEAR SELECTOR IN A VEHICLE

(71) Applicant: Kongsberg Automotive AB, Mullsjö (SE)

(72) Inventor: Johan Viktor Friestedt, Bankeryd (SE)

(73) Assignee: Kongsberg Automotive AB, Mullsjö (SE)

( * ) Notice: Subject to any disclaimer, the term of this patent is extended or adjusted under 35 U.S.C. 154(b) by 680 days.

(21) Appl. No.: 16/331,437

(22) PCT Filed: Sep. 15, 2016

(86) PCT No.: PCT/EP2016/071811
§ 371 (c)(1),
(2) Date: Mar. 7, 2019

(87) PCT Pub. No.: WO2018/050228
PCT Pub. Date: Mar. 22, 2018

(65) Prior Publication Data
US 2019/0219162 A1   Jul. 18, 2019

(51) Int. Cl.
*F16H 61/12*   (2010.01)
*F16H 59/10*   (2006.01)
(Continued)

(52) U.S. Cl.
CPC ......... *F16H 61/12* (2013.01); *F16H 59/0204* (2013.01); *F16H 59/044* (2013.01);
(Continued)

(58) Field of Classification Search
CPC .... F16H 61/12; F16H 59/0204; F16H 59/044; F16H 59/105; F16H 2061/1284; G01D 5/142
See application file for complete search history.

(56) References Cited

U.S. PATENT DOCUMENTS 5,493,928 A * 2/1996 Mitchell ............... F16H 61/12
477/906
5,591,096 A * 1/1997 Wagner ............... F16H 61/12
475/116
(Continued)

FOREIGN PATENT DOCUMENTS

DE         19653193 A1    7/1998
DE    102015203752 A1    9/2016
(Continued)

OTHER PUBLICATIONS

English language abstract for DE 196 53 193 A1 extracted from espacenet.com database on Jul. 22, 2019, 1 page.
(Continued)

*Primary Examiner* — David M Fenstermacher
(74) *Attorney, Agent, or Firm* — Howard & Howard Attorneys PLLC (57) ABSTRACT

The invention relates to an arrangement for reading off predetermined positions of a gear lever (11). A sensor arrangement (1) with a first sensor component (10) moves with the gear lever (11) and a plurality of second sensor components (S21-S25) interacts with the first sensor component (10), wherein in each of the predetermined positions of the gear lever (11), the first sensor component (10) interacts with at least one second sensor component (S21-S25). A position determination unit (30) compares the current sensor output values with stored sensor output values in a table (40). When a faulty condition is detected in one of the sensor components (S21-S25), the stored sensor output values for the faulty sensor component are updated with the faulty output value of the faulty sensor component in the table (40) of expected sensor output values.

18 Claims, 4 Drawing Sheets

| 1 | Signal output | | | | |
|---|---|---|---|---|---|
| GL Position | S21 | S22 | S23 | S24 | S25 |
| R | 0 | 1 | 0 | 0 | 0 |

| 40 | S21 | S22 | S23 | S24 | S25 | Position | 30 |
|---|---|---|---|---|---|---|---|
| | 1 | 0 | 0 | 0 | 0 | P | |
| | 0 | 1 | 0 | 0 | 0 | R | |
| | 0 | 0 | 1 | 0 | 0 | N | |
| | 0 | 0 | 0 | 1 | 0 | D | |
| | 0 | 0 | 0 | 0 | 1 | M | |

(51) Int. Cl.
  *F16H 59/02* (2006.01)
  *F16H 59/04* (2006.01)
  *G01D 5/14* (2006.01)
  *G01D 18/00* (2006.01)

(52) U.S. Cl.
  CPC .......... *F16H 59/105* (2013.01); *G01D 5/142* (2013.01); *G01D 18/00* (2013.01); *F16H 2061/1208* (2013.01); *F16H 2061/1284* (2013.01)

(56) References Cited

U.S. PATENT DOCUMENTS

| | | | | |
|---|---|---|---|---|
| 6,077,187 | A | * | 6/2000 | Suzuki .............. F16H 61/66259 477/906 |
| 10,281,029 | B2 | | 5/2019 | Pfeifer |
| 2005/0126322 | A1 | | 6/2005 | Kozaki et al. |
| 2006/0234831 | A1 | * | 10/2006 | Wheeler ................. F16H 61/12 477/120 |
| 2009/0171544 | A1 | * | 7/2009 | Tanaka .................... F16H 61/32 701/55 |
| 2009/0204282 | A1 | | 8/2009 | Mizutani |
| 2009/0264254 | A1 | * | 10/2009 | Jaeggle ................. F16H 61/688 477/177 |
| 2012/0095656 | A1 | * | 4/2012 | Pudvay ................. F16H 59/044 701/51 |
| 2015/0107392 | A1 | * | 4/2015 | Wang .................... F16H 59/105 74/473.12 |
| 2019/0219162 | A1 | * | 7/2019 | Ahlström ................ F16H 61/12 |
| 2020/0386306 | A1 | * | 12/2020 | Ypma ................. F16H 61/2807 |
| 2021/0006194 | A1 | * | 1/2021 | Kamio .................... H02P 25/22 |

FOREIGN PATENT DOCUMENTS

| | | | |
|---|---|---|---|
| EP | 1138984 | A2 | 10/2001 |
| EP | 2395264 | A2 | 12/2011 |

OTHER PUBLICATIONS

Computer-generated English language abstract for DE 10 2015 203 752 A1 extracted from espacenet.com database on Jul. 22, 2019, 3 pages.
English language abstract for EP 1 138 984 A2 extracted from espacenet.com database on Jul. 22, 2019, 1 page.
International Search Report for Application No. PCT/EP2016/071811 dated May 11, 2017, 3 pages.

* cited by examiner

Fig. 1

| GL Position | Signal output | | | | |
|---|---|---|---|---|---|
| | S21 | S22 | S23 | S24 | S25 |
| R | 0 | 1 | 0 | 0 | 0 |

| | Signal output | | | | |
|---|---|---|---|---|---|
| GL Position | S21 | S22 | S23 | S24 | S25 |
| R | 0 | 0 | 0 | 0 | 0 |

ARRANGEMENT FOR READING OFF PREDETERMINED POSITIONS OF A GEAR LEVER IN A GEAR SELECTOR IN A VEHICLE

The subject application is the National Stage of International Patent Application No. PCT/EP2016/071811, filed on Sep. 15, 2016, the contents of which are incorporated herein by reference in their entirety.

The present invention relates to an arrangement for reading off predetermined positions of a gear lever in a gear selector to change gears in a vehicle. The arrangement comprises a sensor arrangement with a first sensor component configured to move with the gear lever when the gear lever is moved, a plurality of second sensor components that can interact with the first sensor component to detect the position of the first sensor component relative to the plurality of second sensor components, wherein in each of the predetermined positions of the gear lever, the first sensor component interacts with at least one second sensor component. A position determination unit is adapted to receive the signal output of the second sensor components and is configured to determine the position of the gear lever by comparison of the current sensor output values with stored sensor output values in a table of expected sensor output values at the predetermined positions to identify one of the predetermined positions of the gear lever for which the expected sensor output values in the table match the current sensor output values.

A technology that is becoming increasingly common in vehicle gearboxes is the so called "shift-by-wire" technology which is a system by which the transmission modes are engaged/changed in an automobile through electronic controls without a mechanical linkage between the gear shifting lever and the transmission. An important input for the electronic transmission control is the chosen driving mode which the driver controls with the gear lever respectively the gear selector. By moving the gear lever to different predetermined positions (operating positions), the driver chooses the desired drive mode, for example driving forward and backward (D and R in an automatic transmission unit). In an automated manual transmission, the different gear lever positions can correspond to the single gears of the manual transmission, for example first to sixth gear, reverse gear and the neutral position of the gear lever.

The shift-by-wire systems must provide a high level of reliability and the ability to indicate faults when these arise. The major hazard for this type of systems is when the vehicle is not achieving the park state or is moving in the wrong direction caused by faulty signal processing and analysis.

In EP 2 395 264 A2, an arrangement for reading off the position of a gear lever in accordance with the preamble of claim 1 is described. The document is incorporated herein by reference. The sensor arrangement is capable of assuming and identifying a fault in one of the sensor components that indicate one of the gear lever positions by applying a set of rules when the gear lever is moved and the sensor component signal output changes. The position of the gear lever in the gear selector is read off by a sensor arrangement that sends the information about the position of the gear lever to the gearbox to change the gear in accordance with the driver's demands. If one of the sensor components is broken or faulty, then the transmission control unit is capable of assuming the position of the gear lever and can switch in a reduced but still functional mode of the gearbox so that the vehicle can safely be driven home or be driven to be repaired. The expected sensor output signals values of all sensors for each predetermined position of the gear lever are allocated in respectively assigned to a table so that by comparison of the table and the current signal output of the sensor components, the system can identify the current position of the gear lever.

US 2005/0126322 A1 describes an automatic transmission control system equipped with a shift lever position sensor arrangement which includes a plurality of switches to output binary signals following a shifting motion of a gear shift lever. Patterns of combinations of the switch outputs are preselected so as to represent positions to which the gear shift lever is manually movable. The control system also works to perform a 'deemed D-position hydraulic transmission control' to ensure the running of the vehicle in the case the shift lever position sensor is failing. When the signal from the lever position sensor represents a position of the gear shift lever other than the drive position and a predetermined condition is encountered, the gear change controller deems the gear shift lever to be placed in the drive position and performs the 'deemed D-position hydraulic transmission control' to engage one of the forward gears of the automatic transmission.

In order to maintain the functioning of the sensor arrangement even in the case of signal failures and to prevent a reduced driving mode of the vehicle, safety measures are known in the art. Document DE 196 53 193 A1 describes a circuit arrangement to detect the position of a selection lever which is adjustable between several positions. The position of the lever is detected by a detection arrangement and transmitted over a signal line as a position signal to a gearing control mechanism. The position signal is binary coded and comprises an amount of bits necessary for the representation of the possible number of lever positions. The result is a binary bit pattern. The current binary code (binary bit pattern) is compared with a table that contains the binary codes for each of the lever positions. When the current code matches with a stored code, the system recognizes the selected position of the lever. The circuit arrangement is connected with the gearing control mechanism through an additional output signal line, over which a further coded signal is transmitted. This coded signal contains redundant information about the drive area, and bit errors in the position signal are recognized and corrected by the gearing control mechanism using an evaluation of the coded signal. The table of the stored binary bit pattern for each single position also contains the bit patterns that can arise when one of the sensors has a fault so that the system can continue to operate in the normal mode. Due to the pre-defined allocation table, the flexibility of the system is limited and the size of the table is extended. Further, the system depends on the functionality of the additional output signal line and it cannot be ruled out that in the case of a failure of the additional output signal line an incorrect assignment of the chosen lever position occurs.

It is an object of the present invention to provide for an arrangement for reading off predetermined positions of a gear lever, which is simpler in construction and more flexible in terms of responding to faults in the sensor arrangement.

This object is achieved by the arrangement for reading off predetermined positions of a gear lever in a gear selector in a vehicle as defined in claim 1.

According to the present invention, the determination unit is configured such that when a faulty condition is detected in one of the sensor components, which persistently leads to a faulty output signal, the stored sensor output values for the faulty sensor component are updated with the faulty output value of the faulty sensor component in the table of expected sensor output values.

By updating the table, which means that the stored values are overwritten with the values the faulty sensor is actually delivering, the system is capable of adapting itself to sensor failures so that full functionality of the gearbox is maintained, thereby providing a high degree of flexibility. It is not required to anticipate and predetermine the different cases of failure to enable the system to continue to run in normal mode. Thus, failures in the sensor arrangement can be effectively healed.

In the sense of the invention, it is possible to update all stored values for the faulty sensor component, meaning to update the stored sensor output values for the faulty sensor component with the faulty output value of the faulty sensor component in the table of expected sensor output values for all predetermined positions. It is also possible to only update those stored values that require to be corrected, in particular when the involved second sensor component is activated only in some of possible operating positions of the gear lever. Then only the corresponding sensor output values for those predetermined positions are updated.

In each position of the gear lever, the sensor output values are sampled and form a coded signal or a signal pattern which is constituted by the combination of the signal outputs of all sensor components. The coded signal is compared with stored code signals in the table. For each gear lever position, a predetermined code signal is stored in the table. The determination unit iterates through the internal table rows (or columns, depending on how the information is stored) until a matching coded signal is found. Thereby, the determination unit can identify the gear lever position that is assigned to the match.

The stored signal patterns/the combinations of the sensor output values at the single selected positions of the shift lever are preferably different from each other. Accordingly, the coded signal can be unique for each lever position.

When one of the sensor component has a failure, then it constantly delivers the same signal output value/information regardless whether the second sensor component is activated or not by the first sensor component. The table consists of rows and columns, wherein each of the rows is assigned to one of the gear lever positions. Each column in this table can be assigned to one of the second sensor components. Of course, the table can be arranged the other way round with the columns representing the single gear lever positions and the single rows being assigned to one of the second sensor components.

The sensor output values can be constituted by all kinds of possible sensor outputs, such as analog or digital signals. For example, digital sensors may be adapted to transmit an "on" or an "off" signal. Analog sensors may submit sensor values within a certain range. To define the "on" and "off" states for these sensors, respective output value ranges can be defined for both states.

The second sensor components are arranged such that their activation follows the mechanical positions, respectively the mechanical motion pattern of the gear lever. The conditional activation sequence is stored in the determination unit which has the information that a specific operating position of the gear lever (and a corresponding specific output signal of the sensor arrangement) directly follows another specific operating position of the gear lever (and a corresponding specific output signal of the sensor arrangement). In other words, the predetermined sequence of second sensor components that are activated matches the mechanical positioning of the second sensor components so that the second sensor components should be activated in an order that matches their mechanical positioning.

The sensor arrangement is configured such that always at least one of the second sensor components interacts with the first sensor component when the gear lever is moved.

According to a further embodiment of the invention, in each of the predetermined gear lever positions, the first sensor component interacts with only one or multiple second sensor components that are arranged adjacent to each other. In the case of multiple second sensor components, the number of second sensor components is preferably the same in each predetermined gear lever position.

According to a further embodiment of the invention, the sensor arrangement is configured such that a maximum of two second sensor components is activated at the same time. This particularly applies when the gear lever is moving away from or towards one of the predetermined gear lever positions.

In a preferred embodiment of the invention, the sensor component and/or the determination unit is adapted to identify a fault condition of the sensor components. Specific examples of suitable sensor components are magnetic sensors with integrated circuits that offer integrated diagnostics to ensure that the device itself is operating properly and also to ensure that switching occurs at the appropriate time with respect to a change in the magnetic field. A mentionable sensor device is the A1160 unipolar Hall-effect switch of Allegro MicroSystems, LLC, USA that is capable of detecting and identifying a faulty condition in a sensor component. Another suitable sensor is represented by the Hall Switch HAL 1507 of the Micronas GmbH in Freiburg, Germany.

According to a preferred embodiment of the invention, the position determination unit is adapted to generate a multi-digit binary code on the basis of the signal output of the second sensor components, wherein the stored sensor output values are in the form of stored binary codes. A binary code is an effective method to signalize and identify the condition of the sensor, because the sensor element produces the binary information in the form of "1" and "0". The code signal produced by the sensor arrangement is made up of the binary values. Preferably, the second sensor components are designed to deliver the information "1" when activated. The coded signal is constituted by the combination of the binary values of each of the second sensor components. The specific output pattern of this binary code is compared with the stored binary codes that reflect each of the predetermined gear lever positions.

According to a further embodiment of the invention, the sensor arrangement comprises at least one magnetic field sensor, in particular a Hall effect sensor. Hall effect sensors are commonly used in the automotive industry and are capable of giving out the information in the form of a digital waveform pulse.

According to a further embodiment, the determination unit is configured such that in the case that two or more second sensor components are in a faulty condition, the determination units updates the stored sensor output values for the faulty second sensor components with the current faulty sensor output values of the faulty second sensor components only when at least two functional second sensor components are situated between two faulty second sensor components. When two functional second sensor components are placed between two faulty second sensor components, the system can identify the gear lever positions, even when multiple faulty code signals are equal.

Assuming that a functional sensor component is placed directly between two faulty second sensor components, regardless of the direction the gear lever is moved from a position with a functional second sensor component (in the following "functional position"), the gear shift lever is always moved from a functional position into a position with a faulty second sensor component (in the following "faulty position"). In this case, the signal output in both faulty positions can be the same and a valid confirmation of the lever position is not possible. On the other hand, when there are at least two functional second sensor components arranged between two faulty second sensor components, the gear lever can only be moved into a functional or a faulty position. In other words, the proposed arrangement provides for a reliable detection of the gear lever positions, even in the case of multiple sensor failures.

According to a further embodiment of the invention, the determination unit is adapted to restore the stored sensor output values back to the original state as soon as the faulty condition is no longer detected when the faulty sensor component works properly again or has been replaced by a functional sensor component. The original state of the table correspond to the state in which the table contains the expected sensor output values for the predetermined positions of the gear lever under the condition that all second sensor components are working properly. Such a function can be implemented by using the integrated diagnostic system of the sensor components and the determination unit can be configured to reset the table when all sensor components signalize their proper functioning.

The inventions also relates to a gear selector having at least one sensor arrangement as described herein.

The invention will now be described referring to exemplary embodiments shown in the Figures in which.

Figure 1:
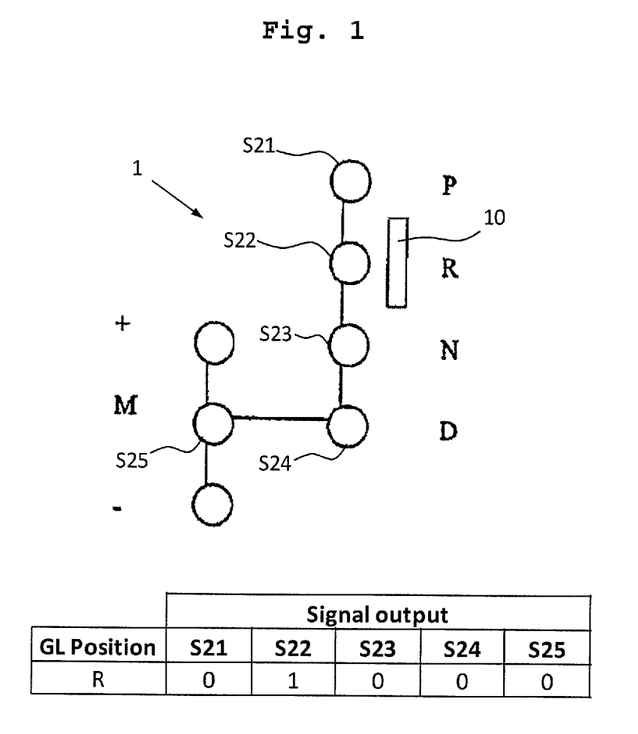
FIG. 1 shows schematically a shift pattern of a gear lever.

FIG. 1 shows schematically a shift pattern of a gear lever provided in conjunction with a regular automatic transmission. The gear lever can be moved between a number of predetermined operating or shift positions along the mechanical shift pattern P, R, N, D and the manual position M with the up and down shifting positions "+" and "−". For the sake of simplicity, the "+" and "−" position will not be considered further in the following explanations. Of course, the invention is not limited to a gear shifter with P, R, N, D and M positions but can be implemented into any type of position detection system to determine the position of the gear lever or any other shifting element with the same purpose.

Along the predetermined shift pattern P-R-N-D-M there is arranged a sensor arrangement 1. The sensor arrangement 1 comprises a first sensor component 10 that is attached to a gear lever (not shown) and that is configured to move with the gear lever when the gear lever is moved through the shift positions (predetermined operation positions). A number of second sensor components S21-S25 distributed along the path the first sensor component 10 can move with the gear lever. The second sensor components S21-S25 suitably correspond in number and positioning to the operating positions P, R, N, D, M the gear lever can assume.

The first sensor component 10 can interact with the second sensor components S21-S25, wherein the first sensor component is constituted by a magnet and each of the second sensor components S21-S25 is sensitive to magnetism. Thus, when the first sensor component 10 is moved through the operating positions and faces a second sensor component S21-S25 in the respective operating position, said second sensor component S21-S25 is agitated by the first sensor component 10.

When the gear lever is moved, the activation sequence of the second sensor components is supposed to follow the mechanical pattern P-R-N-D-M. The second sensor components S21-S25 are arranged along the path of movement of the gear lever such that in each operating position the first sensor component interacts only with the respective second sensor component in that position. In the shown example, the gear lever is in the "R" position. In this position, the first sensor component 10 interacts with the second sensor component S22 and the second sensor component S22 is activated. At the same time, the first sensor component 10 does not interact with the remaining sensor components S21 and S23-S25.

If the gear lever was moved from the "R" position to the "N" position, then the first sensor component 10 faces the third sensor component S23 such that the first sensor component 10 interacts with the third sensor component S23. In this position the first sensor component 10 does not interact with any of the remaining second sensor components S21, S22, S24 and S25. Accordingly, in each one of the predetermined shifting positions P, R, N, D, M of the gear lever, the first sensor component 10 interacts with exactly one of the second sensor components S21-S25.

The second sensor components S21-S25 are configured to output a binary signal. When the single second sensor component S21-S25 is activated by the first sensor component 10, it delivers the information "1" whereas when the second sensor component is not activated by the first sensor component 10, then the second sensor component delivers the information "0". The combined output signals of the second sensor components generate a specific multi-digit binary signal pattern for each operating position of the gear lever.

The table in FIG. 1 illustrates the current signal output of the sensor arrangement 1. The gear lever position (GL position) corresponds to the reverse gear position "R". The signal output of each of the secondary sensor component S21-S25 is illustrated in the table. The result is a binary code in the form 0-1-0-0-0 with only the sensor components S22 in the "R" position indicating an activated state with the information "1".

Figure 2:
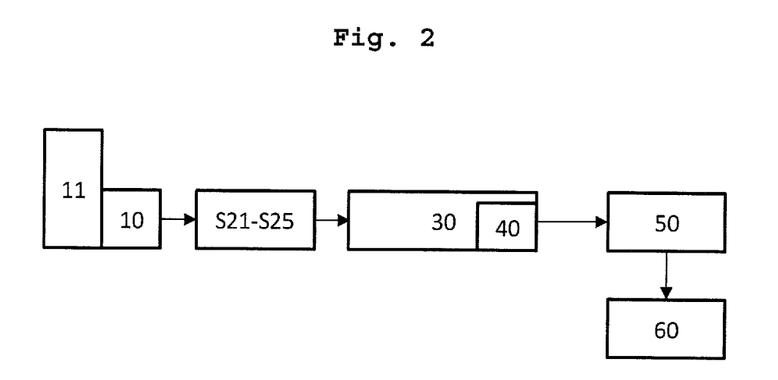
FIG. 2 shows schematically the processing of the signal information to control the gear shifting in a gearbox.

FIG. 2 shows schematically the signal processing for controlling the transmission so that the transmission selects the respective gear. Upon movement of the gear lever 11 into one of the operating positions, the first sensor component 10, which is attached to the gear lever 11, interacts with the respective second sensor component S21-S25, and the sensor arrangement generates a code signal in the form of a binary code pattern. The signal is transferred to a determination unit 30 that receives the signal output of the sensor arrangement 1 respectively the signal outputs from the second sensor components S21-S25. The determination unit 30 determines the operating position of the gear lever 11 by comparing the current output values of the second sensor components S21-S25 with stored sensor output values in a table 40. When the determination unit has determined the position of the gear lever 11 and the respective chosen gear, then the information is transmitted to the transmission control unit 50, and the transmission control unit 50 switches the gear in the gear box 60 in accordance with the vehicle driver's demand.

Figure 3:
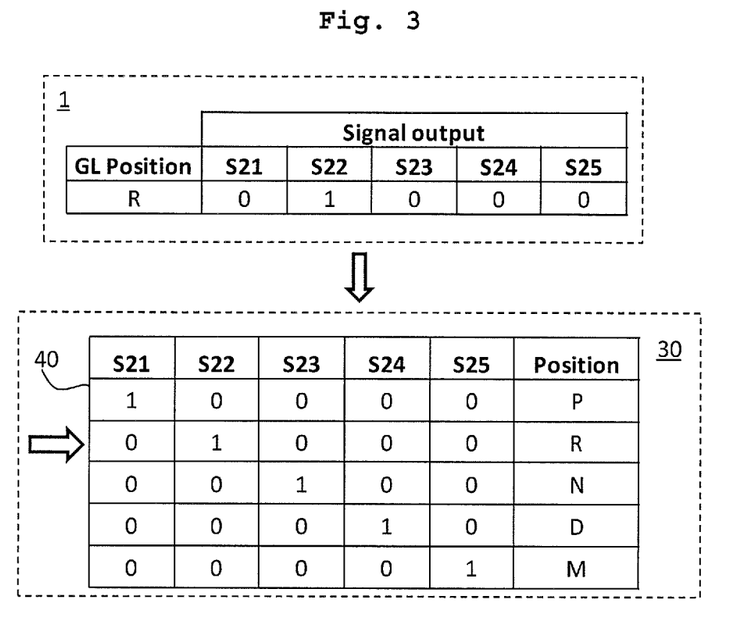
FIG. 3 shows a table of stored sensor signal output values for each predetermined gear lever position.

FIG. 3 shows schematically the processing of the sensor arrangement signal output from FIG. 1 in the determination unit. The signal output from the sensor arrangement 1 in the form of a binary coded signal (signal output) is processed by the position determination unit 30 by comparing the current signal output respectively the current sensor output values with stored sensor output values in the table 40.

For each predetermined gear lever position (P, R, N, D, M) the table 40 contains the corresponding signal combination in the form of a binary code. In the single columns (S21 to S25) of each line associated with one of the gear lever position (P, R, N, D, M), the expected second sensor component output values are stored.

The determination unit 30 iterates through the lines of the table and analyzes the signal output from the sensor arrangement 1 by comparing the combination of the signal output of the second sensor components S21 to S25 (binary code) with the stored combinations. Once the determination unit 30 finds a signal combination in the table that matches the received signal combination, the determination unit 30 determines that the gear lever is in the respective predetermined position. As shown in the example, the received signal output matches the line of the table 40 that is associated with the gear lever position "R" (indicated with an arrow). This information is transmitted to the transmission control unit, which in turn controls the gearbox to change into the reverse gear.

Figure 4:
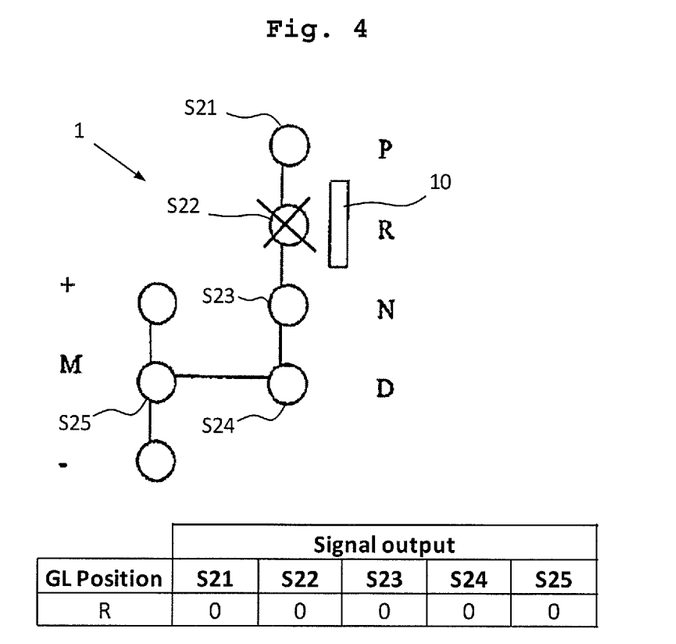
FIG. 4 shows the shift pattern of FIG. 1 with a faulty second sensor component.

FIG. 4 shows the arrangement of FIG. 1, wherein the second sensor component S22 associated with the "R" position of the gear lever is in a faulty condition, which means that nevertheless whether the second sensor component S22 is activated by the first sensor component 10 or not, the second sensor component S22 always outputs the same signal information, which is "0".

Figure 5:
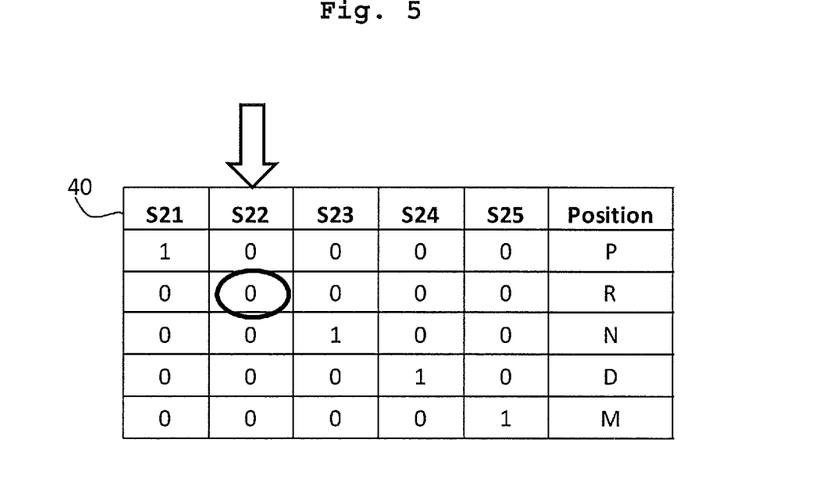
FIG. 5 shows the table of FIG. 3 after the table has been updated in response to the faulty second sensor component in FIG. 4.

FIG. 5 shows exemplarily the adjustment of the system in response to a fault in the sensor arrangement as shown in FIG. 4. When the gear lever is in the "R" position, the signal output of the second sensor components S21 to S25 is as indicated in the table in the Figure with all of the second sensor components S21 to S25 signalizing the binary condition "0". As the signal combination does not match any of the stored sensor output values in the table 40 (FIG. 3), the determination unit is first not capable of determining the position of the gear lever on the basis of the information delivered.

The second sensor components S21-S25 each include an integrated diagnostics that informs the determination unit whether the single second sensor component is working properly or not. When one of the second sensor components is not working properly and is in a faulty condition, then this information is transmitted to the determination unit. The determination unit then updates (reprograms) the table 40 as indicated by the arrow and the circle. The cell of the second column S22 that is associated with the gear lever position "R" is updated with the faulty respectively the current output value of the sensor component S22. Of course, it is possible to update all the cells of the column of a faulty sensor.

Due to the update, the interpretation failure in the table is no longer present. When the determination unit now compares the output signal of the sensor arrangement (FIG. 3), it can identify the gear lever position "R" as the current sensor output values match the stored sensor output values in the line associated with the gear lever position "R". This ensures that the transmission control unit can proceed as foreseen.

Figure 6:
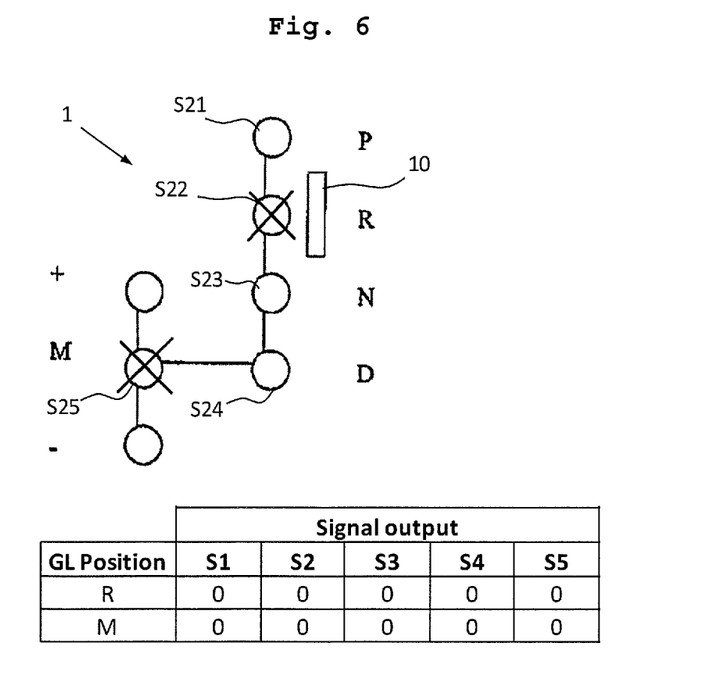
FIG. 6 shows the shift pattern of FIG. 1 with two faulty second sensor components.

In FIG. 6, two second sensor components (S22 and S25) are in a faulty condition. When the driver sets the gear lever to the "R" position the signal output of the second sensor components is the same as in the position "M" as shown in the signal output table. As it is the case described with respect to the FIGS. 4 and 5, the determination unit 30 is informed about the faulty condition of the two sensors components S22 and S25.

The determination unit 30 now checks whether there are at least two working sensors (S23 and S24) arranged along the path of motion in the gear lever arrangement between the faulty ones (S22, S25). If that condition applies, the determination units 30 updates the table 40 as described with respect to FIG. 5.

Figure 7:
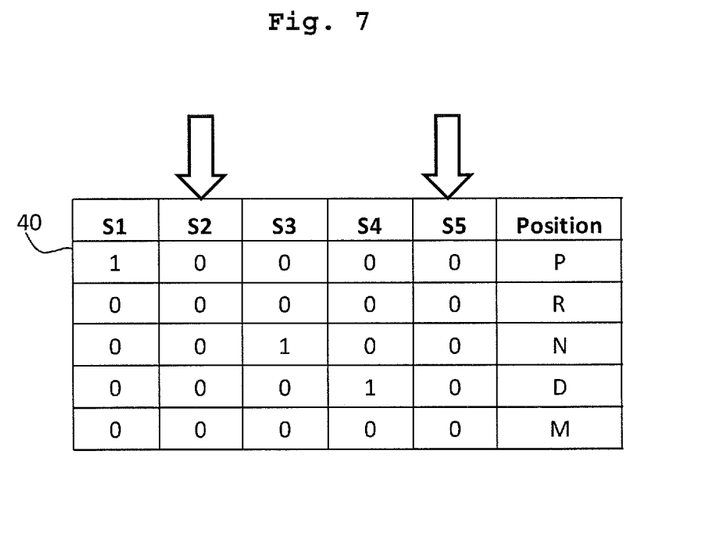
FIG. 7 shows the table of FIG. 3 after the table has been updated in response to the two faulty sensor components in FIG. 6.

The updated table is shown in FIG. 7. Assuming that the gear lever is moved from the position "P" into the position "R" the determination unit can identify the position "R" as the preceding position is the "P" position and the gear lever has not yet passed the "N" position. This is due to the fact that the second sensor components are arranged such that their activation sequence follows the mechanical positions, respectively the motion pattern of the gear lever when the sensor arrangement is working properly without a sensor failure. The determination has stored this coherence and knows that the gear lever can only be moved into the "R" position from the "P" position. Similarly, the gear lever can only be moved into the "P" position or into the "N" position when starting from the "R" position.

When the gear lever is moved from the "R" position (faulty position) in either of the "P" or "N" position, the determination unit can determine the respective position, as the second sensor components in these positions are working properly.

Assuming that the gear lever is moved from "D" position (functional position) to the "M" position (faulty position), the determination unit can identify the "M" position because in the opposite direction the gear lever would be moved to the "N" position which is again a valid position with working second sensor components. As indicated above, the determination unit is has stored the information about the conditional activation sequence of the second sensor components.

Due to the fact that there are at least two working sensors between two faulty ones, and due to the fact that the determination unit is aware of the sensor arrangement along the path P-R-N-D-M, it is always ensured that the determination unit can identify the correct position of the gear lever even though the table contains two lines with the same pattern of signal output values.

REFERENCE NUMERALS

1 Sensor arrangement
10 first sensor component
11 gear lever
S21 second sensor component
S22 second sensor component
S23 second sensor component
S24 second sensor component S25 second sensor component
30 determination unit
40 table
50 transmission control unit
60 gearbox

The invention claimed is:

1. An arrangement for reading off predetermined positions of a gear lever in a gear selector to change gears in a vehicle, said arrangement comprising:
a sensor arrangement having a first sensor component adapted to be attached to the gear lever such that the first sensor component is movable with the gear lever when the gear lever is moved and a plurality of second sensor components configured to interact with the first sensor component to detect a position of the first sensor component relative to the plurality of second sensor components wherein in each of the predetermined positions of the gear lever, the first sensor component interacts with at least one of the plurality of second sensor components; and
a position determination unit adapted to receive a signal output of the plurality of second sensor components and configured to determine a position of the gear lever by comparison of the current sensor output values with stored sensor output values in a table of expected sensor output values at the predetermined positions to identify one of the predetermined positions of the gear lever for which the expected sensor output values in the table match the current sensor output values,
wherein the determination unit is configured such that when a faulty condition is detected in one of the plurality of second sensor components, which persistently leads to a faulty output signal, the stored sensor output values for the faulty sensor component are updated with the faulty output value of the faulty sensor component in the table of expected sensor output values.

2. The arrangement as defined in claim 1, wherein the first sensor component interacts with only one or multiple adjacent second sensor components.

3. The arrangement as defined in claim 1, wherein the sensor arrangement is arranged such that a maximum of two second sensor components is activated at the same time.

4. The arrangement as defined in claim 1, wherein one of the sensor arrangement and the determination unit is adapted to identify the faulty condition in one of the plurality of second sensor components.

5. The arrangement as defined in claim 1, wherein the position determination unit is adapted to generate a multi-digit binary code based on the signal output of the plurality of second sensor components, and the stored sensor output values are in the form of stored binary codes.

6. The arrangement as defined in claim 1, wherein the sensor arrangement comprises at least one magnetic field sensor.

7. The arrangement as defined in claim 6, wherein the magnetic field sensor is a Hall effect sensor.

8. The arrangement as defined in claim 1, wherein the determination unit is adapted to restore the stored sensor output values to an original state as soon as the faulty condition is no longer detected, when the faulty sensor component works properly again or has been replaced by a functional sensor component.

9. The arrangement as defined in claim 1, wherein the determination unit is configured such that when two or more second sensors components are in the faulty condition, the determination unit updates the stored sensor output values for the faulty second sensor components with the faulty sensor output values only when at least two functional second sensor components are situated between two faulty second sensor components.

10. A gear selector comprising:
a gear lever; and
at least one sensor arrangement including:
a sensor arrangement having a first sensor component adapted to be attached to the gear lever such that the first sensor component is movable with the gear lever when the gear lever is moved and a plurality of second sensor components configured to interact with the first sensor component to detect a position of the first sensor component relative to the plurality of second sensor components wherein in each of the predetermined positions of the gear lever, the first sensor component interacts with at least one of the plurality of second sensor components; and
a position determination unit adapted to receive a signal output of the plurality of second sensor components and configured to determine a position of the gear lever by comparison of the current sensor output values with stored sensor output values in a table of expected sensor output values at the predetermined positions to identify one of the predetermined positions of the gear lever for which the expected sensor output values in the table match the current sensor output values,
wherein the determination unit is configured such that when a faulty condition is detected in one of the plurality of second sensor components, which persistently leads to a faulty output signal, the stored sensor output values for the faulty sensor component are updated with the faulty output value of the faulty sensor component in the table of expected sensor output values.

11. The gear selector as defined in claim 10, wherein the sensor arrangement is arranged such that a maximum of two second sensor components is activated at the same time.

12. The gear selector as defined in claim 10, wherein one of the sensor arrangement and the determination unit is adapted to identify the faulty condition in one of the plurality of second sensor components.

13. The gear selector as defined in claim 10, wherein the position determination unit is adapted to generate a multi-digit binary code based on the signal output of the plurality of second sensor components, and the stored sensor output values are in the form of stored binary codes.

14. The gear selector as defined in claim 10, wherein the sensor arrangement comprises at least one magnetic field sensor.

15. The gear selector as defined in claim 14, wherein the magnetic field sensor is a Hall effect sensor.

16. The gear selector as defined in claim 10, wherein the determination unit is configured such that when two or more second sensors components are in the faulty condition, the determination unit updates the stored sensor output values for the faulty second sensor components with the faulty sensor output values only when at least two functional second sensor components are situated between two faulty second sensor components.

17. The gear selector as defined in claim 10, wherein the determination unit is adapted to restore the stored sensor output values to an original state as soon as the faulty condition is no longer detected, when the faulty sensor component works properly again or has been replaced by a functional sensor component.

18. The gear selector as defined in claim 10, wherein the first sensor component interacts with only one or multiple adjacent second sensor components.

\* \* \* \* \*